Jan. 18, 1966  W. S. EGGERT, JR  3,229,855
DISPENSING APPARATUS
Filed Nov. 21, 1963  4 Sheets-Sheet 1

INVENTOR.
WALTER S. EGGERT, JR.
BY
Douglas R. McKechnie
ATTORNEY

Jan. 18, 1966 W. S. EGGERT, JR 3,229,855
DISPENSING APPARATUS
Filed Nov. 21, 1963 4 Sheets-Sheet 2

INVENTOR.
WALTER S. EGGERT, JR.
BY
Douglas Q. McKechnie
ATTORNEY

Jan. 18, 1966 W. S. EGGERT, JR 3,229,855
DISPENSING APPARATUS
Filed Nov. 21, 1963 4 Sheets-Sheet 3

INVENTOR.
WALTER S. EGGERT, JR.
BY
Douglas R. McKechnie
ATTORNEY

United States Patent Office 3,229,855
Patented Jan. 18, 1966

3,229,855
DISPENSING APPARATUS
Walter S. Eggert, Jr., Philadelphia, Pa., assignor to The Budd Company, Philadelphia, Pa., a corporation of Pennsylvania
Filed Nov. 21, 1963, Ser. No. 325,233
4 Claims. (Cl. 222—131)

This invention relates to apparatus for dispensing liquids and, more particularly, to apparatus for dispensing a plurality of liquids in metered quantities and in predetermined ratios.

In many fields, it is now common to merely store or to store and treat two or more liquids and to dispense and mix them for polymerization thereof. One example is the conditioning of caprolactam for forming polycaprolactam by the base-catalyzed polymerization of the monomer under anhydrous conditions in the presence of a catalyst and a promoter. Here, the caprolactam is melted and is divided into two parts which are heated separately under dry, inert atmospheres, one part being catalyzed and the other part being mixed with a promoter. The two parts are then mixed in suitable proportions to cause polymerization thereof. Accordingly, one of the objects of the invention is to provide apparatus for dispensing a plurality of liquids in predetermined quantities and ratios.

Another object is to provide apparatus for dispensing a plurality of liquids, which apparatus can be operated to dispense the liquids separately or together.

Still another object of the invention is to provide apparatus that can be adjusted to vary either or both the quantities and ratios of the dispensed liquids.

A further object is to provide dispensing apparatus that is positive in action and is not responsive to flow, for accurately and readily metering a predetermined quantity of liquids.

A still further object is to provide dispensing apparatus for treating the material to be dispensed.

Another object is to provide dispensing apparatus having a plurality of piston pumps with novel means for actuating the pumps.

Another object is to provide dispensing apparatus that is operable at a relatively high temperature.

Still another object is to provide dispensing apparatus that can be readily assembled and disassembled to permit cleaning and drying thereof.

Other objects and advantages of the invention will be apparent from the following description taken in connection with the accompanying drawing wherein.

In general, the dispensing apparatus of the invention comprises a plurality of dispensing units containing piston pumps that can be operated together or independently to dispense a plurality of liquids in predetermined quantities and ratios, the apparatus being adjustable to vary both the quantities and the ratio. The apparatus is further designed to treat the liquids prior to dispensing thereof, by heating and agitating the liquids under a controlled atmosphere, e.g., inert.

Referring now more specifically to the drawings, the illustrated trated apparatus comprises two, vertical, parallel, adjacent dispensing units 10 and 11 mounted on a support stand 12. The dispensing units are connected, in a manner more fully described below, to a dispensing nozzle 13, each unit being of similar construction so that only one need be described in detail.

Figure 2:
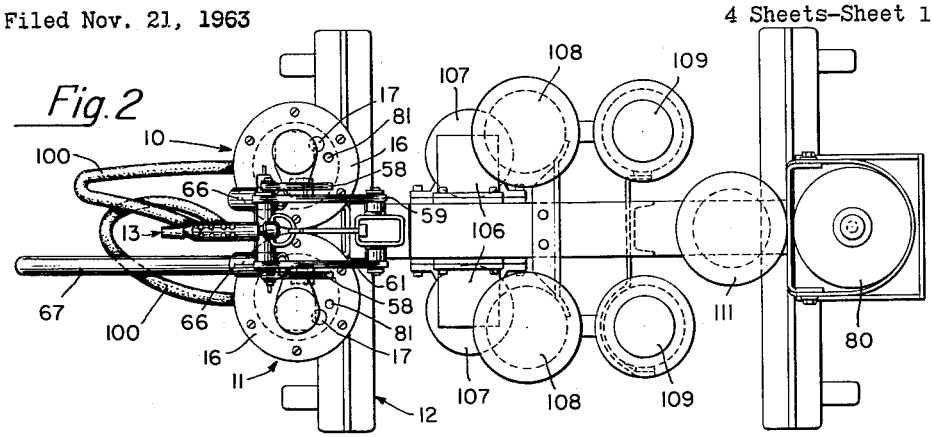
FIGS. 1 and 2 are side elevational and top plan views, respectively, of dispensing apparatus embodying the invention.
Figure 1:
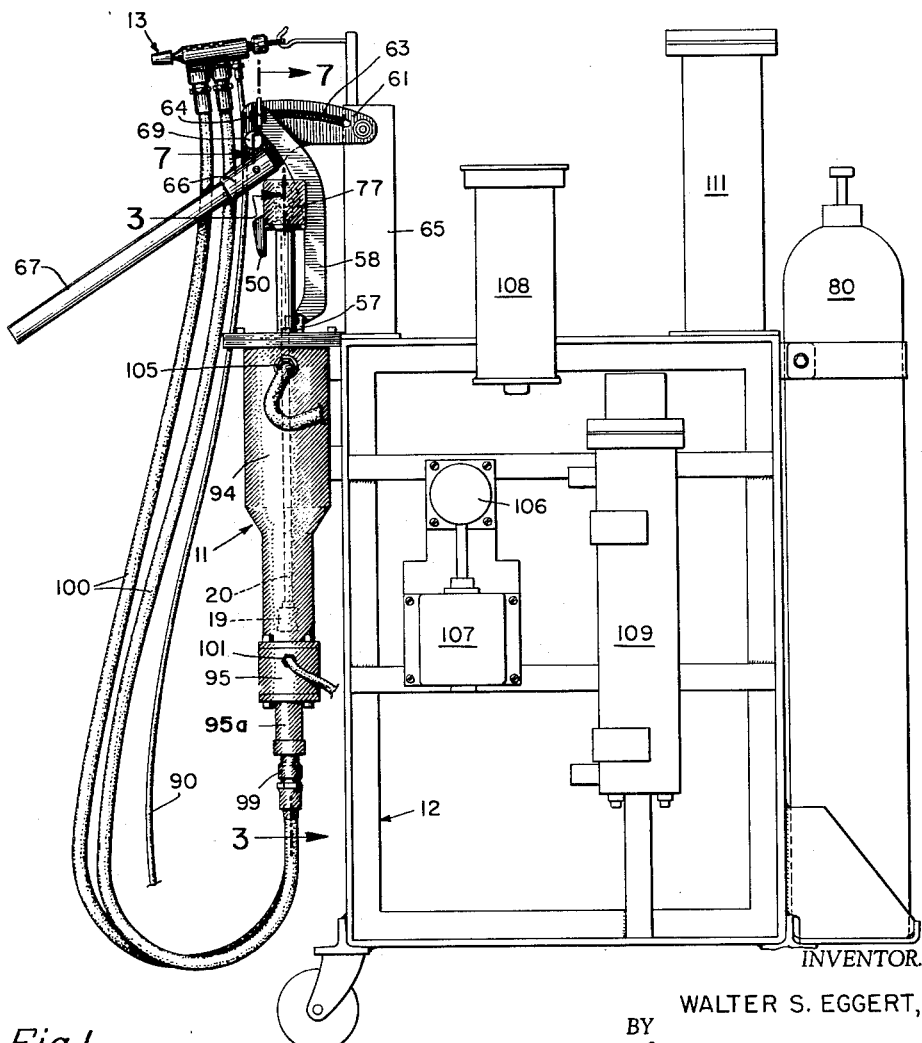
Figure 3:
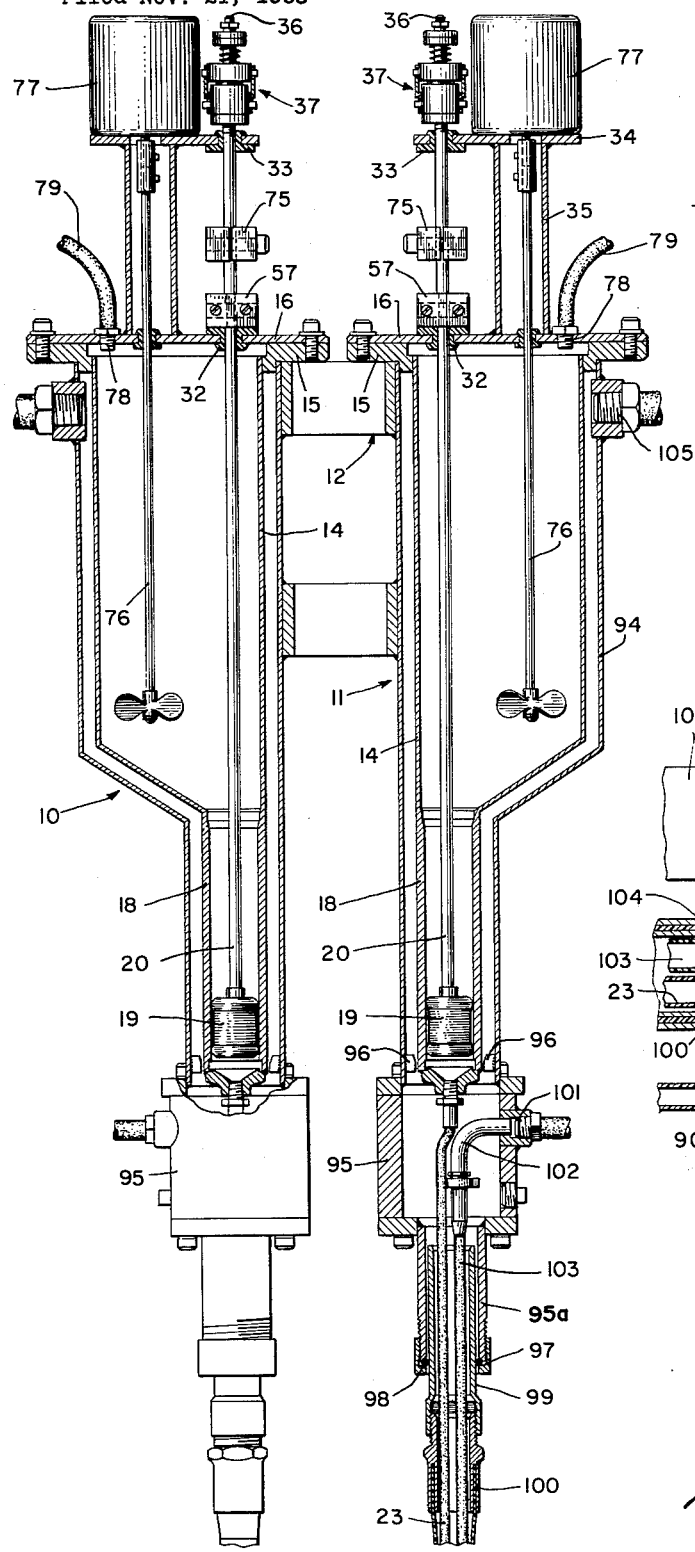
FIG. 3 is a vertical, longitudinal sectional view along lines 3—3 of FIG. 1.

As best seen in FIG. 3, unit 11 comprises a cylindrical tank 14 adapted to store a quantity of liquid. The upper end of tank 14 is connected to an outwardly extending flange 15 to which is releasably connected, as by bolting, a removable cricular cover 16 that extends across the top of the tank. Cover 16 is provided with a removable plug 17 (FIG. 2) that allows liquid to be poured into the tank through the cover.

Unit 11 further comprises a reciprocating valved piston type of expansible chamber pump comprising a cylinder 18, a piston assembly 19 hereafter referred to as piston 19, and a piston rod 20. Cylinder 18 is vertical and of circular annular cross section. The upper end of cylinder 18 is connected to the lower end of tank 14, and the axis of cylinder 18 is laterally offset from the axis of tank 14 towards the adjacent dispensing unit. The lower end of cylinder 18 has an outlet 22 connected by a flexible hose 23 to nozzle 13.

Piston 19 is reciprocable and is disposed in cylinder 18 to form beneath the piston an expansible metering chamber 24 into which liquid is admitted on the upstroke of piston 19 and from which liquid is forced upon the downstroke of the piston. Piston 19 includes a main body 25 having upper and lower flexible lips 26 biased by coiled, annular springs 27 into sliding, sealing engagement with the inner walls of cylinder 18, the body being of a material, e.g., polytetrafluoroethylene, which is self-lubricating and chemically resistant to the liquid being dispensed, as are all other materials in contact therewith. The lower end of piston rod 20 is threaded and is screwed into body 25 and both the lower end and the body are bored to form a flow passage 28 that extends through the piston. The lower end of the flow passage is surrounded by a conical, annular valve seat 29 associated with a conical valve member 30 that is moveable between open and closed positions relative to the valve seat for controlling the flow of liquid through flow passage 28 and piston 19. As pointed out below, the valve member is manually actuated and it is not responsive to flow rates so that it can be seated and unseated without leakage to thereby accurately meter the desired quantity.

Piston rod 20 extends upwardly from piston 19 and passes through a bushing 32 in cover 16 and a bushing 33 in a support plate 34 mounted on top of a tube 35 connected to the cover. Piston rod 20 is tubular and is coaxial with a valve actuating rod 36 whose lower end extends below the lower end of rod 20 and is connected to valve member 30. The lower end of piston rod 20 is counterbored and is sealed by O-ring seals 38 mounted in grooves on the actuating rod. The upper end of rod 36 extends above the upper end of piston rod 20 and the upper ends of both rods are connected to a manually actuated valve actuating mechanism 37.

Figure 5:
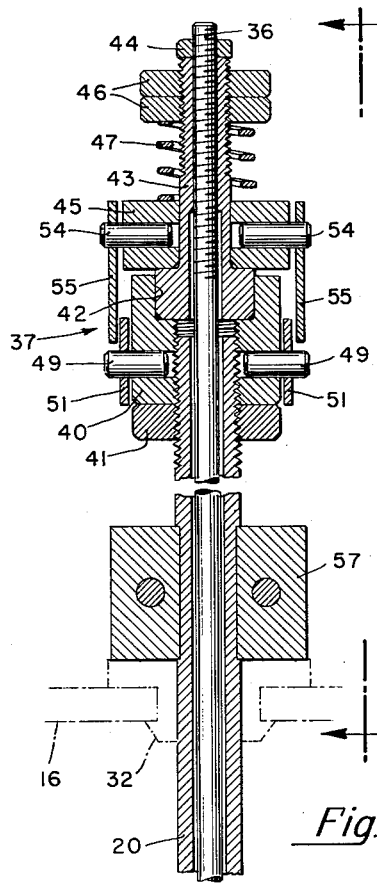
FIG. 5 is a vertical sectional view through a detail shown in FIG. 3.
Figure 6:
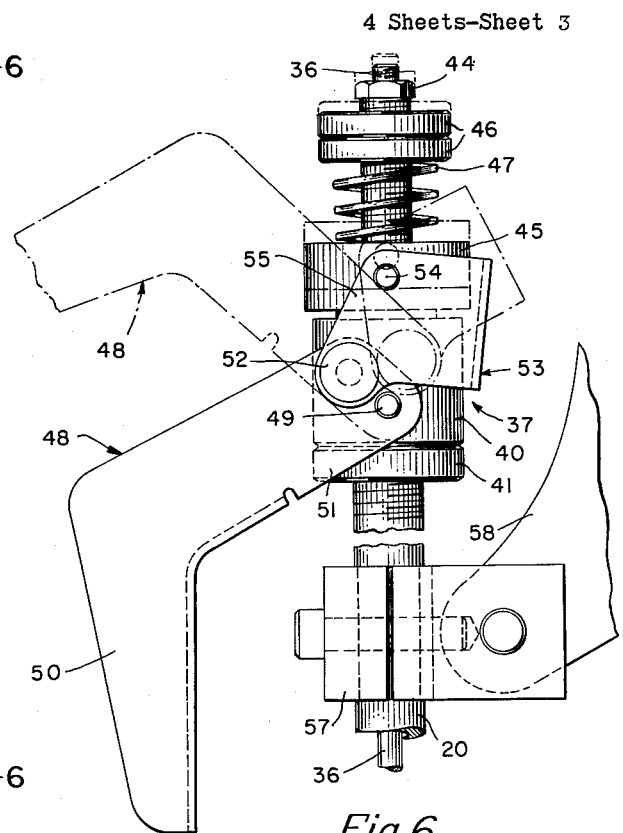
FIG. 6 is a side elevational view of a detail looking along lines 6—6 of FIG. 5.

With reference to FIGS. 5 and 6, it will be seen that mechanism 37 generally comprises a manually-operated, quick-acting, toggle joint having a yieldable connection. More specifically, mechanism 37 comprises a seat nut 40 screwed onto the upper, threaded end of piston rod 20 and locked in place by a jam nut 41. Seat nut 40 has a cup-shaped, upwardly-opening recess 42 that receives the lower, enlarged cylindrical end of a slider guide 43 screwed onto the upper threaded end of valve actuating rod 36 and locked thereto by a nut 44.

Slider guide 43 has a smooth cylindrical shank slidably engaging an annular, concentric slider 45. The upper end of guide 43 is externally threaded and supports a pair of jam nuts 46. Mounted coaxially to guide 43 and between slides 45 and the lower jam nut 46 is a helical compression spring 47 that biases slider 45 against the lower enlarged portion of guide 43.

A lever 48 is pivotally mounted on the upper end of the piston rod by means of a pair of pivot pins 49 mounted on seat nut 40. Lever 48 includes a handle 50 and a pair of parallel arms 51 that straddle nut 40 and are connected to the pivot pins. Lever 48 carries a pair of roll pins 52 connected to a link 53 which, in turn, is connected to slider 45 by a pair of roll pins 54. Link 53 includes a pair of parallel arms 55 that straddle slider 45 and arms 51. Pins 49, 52 and 54 are arranged to provide an over-center toggle action. In such arrangement, the pins are parallel and pins 49 and 54 are coplanar. Pins 49 are fixed relative to the others so that pins 54 reciprocate with slider 45 and pins 52 oscillate from one side to the other side of the plane of pins 49 and 54. The positions of the pins is illustrated in FIG. 6 wherein the full line positions correspond to those which occur when valve member 30 is open and lever 48 is in the full line position and the dotted line positions correspond to those which occur when valve member 30 is closed and lever 48 is in the dotted position.

The operation of mechanism 37 is as follows: When lever 48 is pivoted from the full line position to the dotted line position (FIG. 6), hereafter denoted the opening position and the closed position respectively to correspond to the position of the valve member, pins 52 move over-center causing pins 54 to move first upwardly until the pins 52 pass through the center and then downwardly. During such movement, lever 48 is pivoted until it abuts the bottom end of slider 45. Such movement of pins 54 moves slider 45 upwardly and then downwardly, whereby spring 47 moves slider guide 43 and rod 36 upwardly until valve member 30 engages the valve seat. This closing of the valve member occurs before pins 52 pass over-center so that after the valve member closes, the bottom of slider 45 disengages the upper surface of the enlarged head of slider guide 43 to provide a yieldable connection. This disengagement causes spring 47 to be compressed further until pins 52 pass over-center whereby such compression is relieved partially. Thus, it is only necessary to pivot lever 48 manually until the pins 52 pass over-center whereupon the energy stored in the spring is released and pivots lever 48 to the closed position. The action of mechanism 37 upon moving lever 48 from the closed position to the open position is the reverse of the above action.

Mounted on piston rod 20 is a connector block 57 that pivotally connects the piston rod to the lower end of a link 58 of a pump actuating mechanism mounted above the dispensing unit tank. It is in this area that the dispensing units differ slightly since in dispensing unit 10, the upper end of link 58 is pivotally connected to a lever 59 by a fixed pivot pin 60 whereas the upper end of link 58 of unit 11 is pivotally connected to a lever 61 by a moveable pivot pin 62 that is adjustable along a slot 63 in lever 61. Pin 62 comprises a wing bolt 64 that can be loosened and tightened to allow such adjustment. Levers 59 and 61 are parallel and are pivoted at their rear ends of a vertical portion 65 of stand 12 for pivotal movement about a horizontal axis extending transversely of the stand through portion 65. Each lever includes a socket 66 adapted to receive a handle 67 for actuating the pumps.

Figure 7:
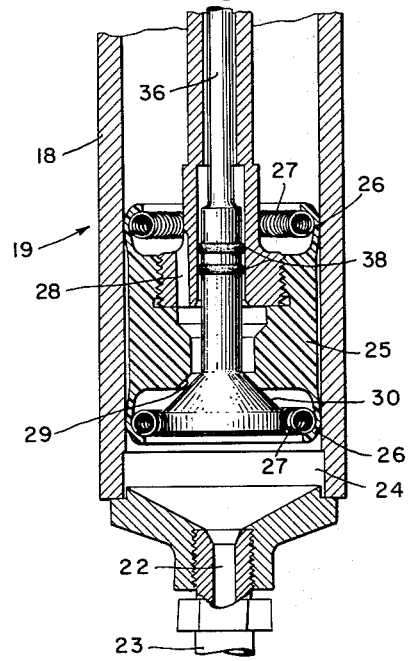
FIG. 7 is a sectional view along lines 7—7 of FIG. 1, FIGS. 3–7 being on enlarged scales relative to that of FIGS. 1 and 2, for clarity of illustration.

As best seen in FIG. 7, levers 59 and 61 are further provided with alignable, transversely extending studs 68 and 69, respectively, which are threaded at 70 and 71 to receive a wing bolt 72 that releasably locks the levers together for simultaneous movement. Obviously, studs 68 and 69 are equidistant from the pivotal axis of the levers. Bolt 72 is carred by stud 68 and is threaded along its central portion for engagement with threads 70 and at its tip or end for engagement with threads 71. By unscrewing bolt 72 to disengage its tip from stud 69, the levers 59 and 61 can be operated separately and independently.

Assuming levers 59 and 61 to be locked together, it will be seen that pivotal movement of handle 67 pivots the levers and is so doing causes links 58 to raise and lower piston rods 20 and pistons 19. The length of each piston stroke is proportional to the angle through which handle 67 is pivoted and to the distance of pivot pins 60 and 62 from the pivotal axis of the levers. The maximum distance of the adjustable pin 62 is equal to the fixed distance of pin 60 whereby the strokes can be equal. By moving pivot pin 62 from its maximum position towards the pivotal axis of lever 61, the length of stroke of the piston associated therewith is decreased so as to lessen the quantity dispensed by the dispensing unit 11 whereby the amount dispensed by unit 10 will be either equal to or greater than that dispensed by unit 11, depending upon the position of pin 62.

The downstrokes of the piston are limited by blocks 57 engaging bushings 32. The upstrokes are limited by adjustable stop blocks 75 mounted on the piston rods and engageable with bushings 33. When the units are operated simultaneously, it is only necessary to adjust one of blocks 75 to the proper height for setting the quantities to be dispensed. When the units are operated independently, the blocks can be adjusted so as to dispense different quantities. In this respect, it is assumed that in order to dispense a desired quantity, handle 67 will be pivoted through the angle defined on the downstroke by block 57 and on the upstroke by block 75. Obviously, where the dispensed quantity is not critical, or need not be accurate, the lever can be pivoted through less than its maximum angular range.

As best seen in FIG. 3, each dispensing unit is also provided with a rotary stirrer 76 driven by a motor 77 mounted on plate 34, the stirrer 76 extending downwardly through a suitable bushing in cover 16. Additionally to provide an inert atmosphere, covers 16 are provided with inlets 78 connected through suitable hoses 79 to receive gas from a source of an inert gas such as a pressurized tank 80 containing e.g., dry nitrogen. Each cover has a vent hole 81 (FIG. 2) through which gas is vented from the tank. As previously indicated, the covers are removable and this is accomplished by disconnecting links 58 from blocks 52 to permit removal of each cover, piston rod, piston and stirrer as a unit for flushing, cleaning and drying of the apparatus.

Figure 4:
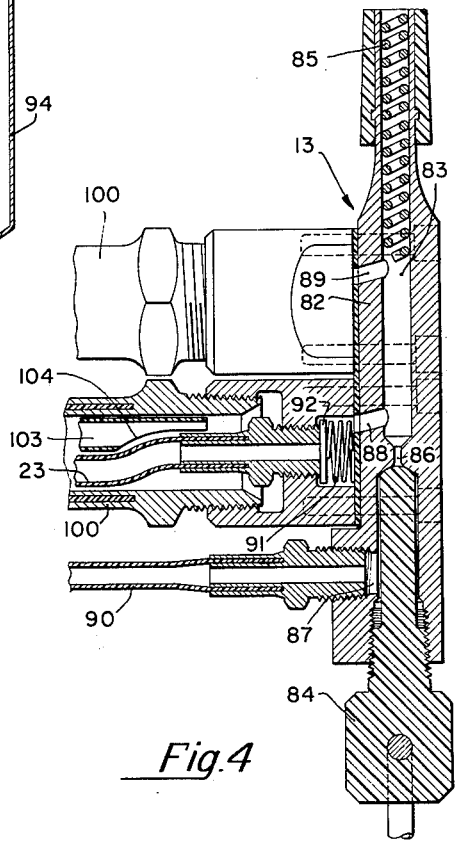
FIG. 4 is a longitudinal sectional view through the dispensing nozzle.

With reference to FIG. 4, nozzle 13 comprises a body 82 having a longitudinal bore 83 passing therethrough, one end of the bore being threaded for receipt of a manually actuated valve 84. The other end of bore 83 is open and is the outlet for dispensing liquids from the nozzle. Adjacent the open end, a coil 85 is inserted in bore 83 to assist mixing the liquids when both dispensing units are operated together. Bore 83 is also provided with a venturi section 86 which valve 84 controls the flow through. Body 82 is provided with three transversely extending inlets 87, 88, 89. Inlet 87 is detachably connected to a flexible hose 90 for supplying dry heated gas to the nozzle so that when the valve 84 is open, gas flows through venturi 86 and through the outlet of bore 83. The venturi is effective to both reduce the gas pressure and to increase its velocity.

The remaining two inlets 88 and 89, are connected to hoses 23 through suitable check valves each comprising a compression spring 91 and disc 92 arranged to allow flow only outwardly of hose 23. In operation, when valve 84 is open, gas flows through the nozzle so that if the dispensing units are operated, the dispensed liquids flow from hoses 23, through the check valves and inlets 88 and 89 into bore 83 where they are entrained in the longitudinal flow of gas and are blown through the nozzle, the gas and turbulent action caused by coil 85 aiding in the mixing of the liquid.

In order to treat the liquids by heating them prior to dispensing thereof, each dispensing unit is provided with an outer, spaced-wall shell or jacket 94 that surrounds tank 14 and cylinder 18. The upper end of jacket 94 is connected to flange 15 and the lower end terminates in an oil chamber block 95 located beneath cylinder 18. Tank 14 and cylinder 18 form an inner shell with respect to the outer jacket and they depend from flange 15, the lower end of cylinder 18 being held in a spaced relationship to the outer shell by a plurality of spacers 96 that are angularly spaced to permit oil to flow past them. The lower end of block 95 comprises a dependent tube 95a having a connector 97 screwed thereonto. The connector forces an O-ring seal 98 against an adapted 99 that extends upwardly into tube 96 and is rotatable relative thereto to provide a swivel coupling or connection. The lower end of adapter 99 is connected to an outer hose 100 whose lower end is detachably connected to nozzle 13. An oil inlet 101 is provided in oil chamber block 95 and this inlet is connected through an elbow 102 and connector to a hose 103 whose lower end is open, as indicated at 104. An oil outlet 105 is provided near the top of jacket 94. Hoses 23 and 100 are wire jacketed, polytetrafluoroethylene hoses that are torsionally stiff but are flexible transversely, whereas hoses 103, because they are not subject to a high pressure differential, need not be jacketed in order to withstand the effects of high temperature and pressure. Hoses 23 act as tensile cores to carry the pull upon the hoses, whereas hoses 100 merely confine the liquids. Because of the torsional stiffness of hoses 100, any transverse movement of nozzle 13 will swivel the upper ends of hoses 100 in the swivel coupling. However, hoses 23 are of relatively small diameter and therefore can be twisted somewhat so that the upper ends need not be swiveled. Such torsional rigidity limits movements of nozzle 13 so that it can be freely moved in a vertical plane but meets resistance when moved laterally or twisted. The ends of hoses 100 and 23 are screwed into connectors detachably connected to the body 82 to permit dissembly of the nozzle for the purposes of flushing, cleaning and drying the hoses and nozzle.

Figure 8:
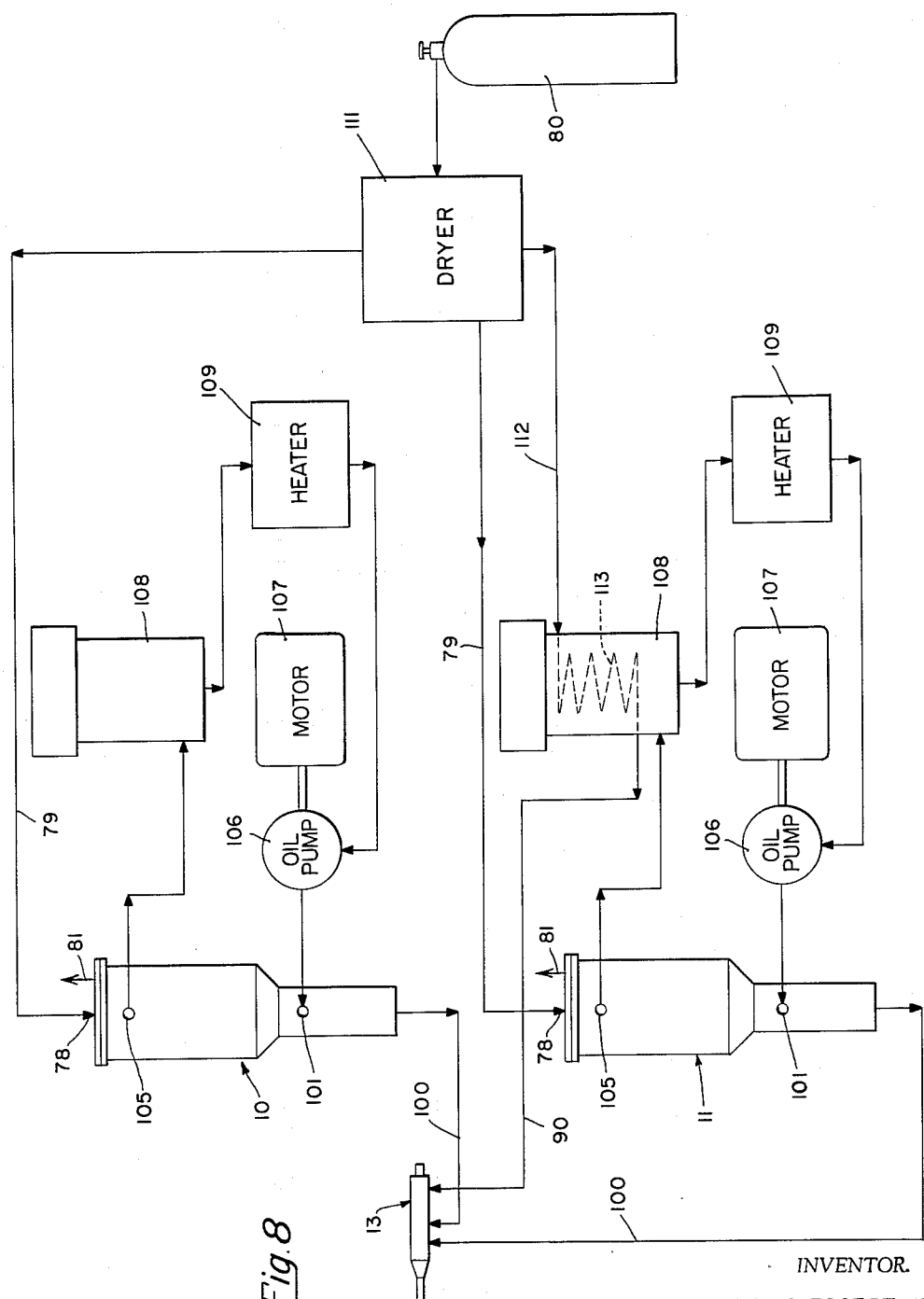
FIG. 8 is a schematic view of a portion of the dispensing apparatus.

As shown schematically in FIG. 8, each dispensing unit is associated with a hot oil circulating system comprising an oil pump 106 driven by a motor 107 for circulating oil into inlet 101 and through the dispensing unit outlet 105, a reservoir 108 and a heater 109 of any suitable type capable of heating the oil and maintaining it at a desired temperature. As hot oil enters inlet 101, it flows downwardly through hose 103 and empties at 104, into hose 100 where it flows around the base of hose 23 and heats nozzle 13 by conduction. The hot oil then flows upwardly between hoses 100 and 23, through oil chamber block 95 between jacket 94 and the inner shell, and out of outlet 105.

Again, with reference to FIG. 8, the gas supplied from tank 80 is passed through a dryer 101 having three outlets. Two outlets are connected to hoses 79 to supply the insert gas to the tanks. The remaining outlet is connected by a conduit 112 to a heating coil 113, disposed in one reservoirs 108 so as to be heated by the oil therein, and coil 113 is connected to hose 90.

*Operation*

Since the illustrated dispensing apparatus was designed for use in treating and dispensing caprolactam prior to the base-catalyzed polymerization thereof, the operation will be described with reference to such use. One important factor in treating and handling the caprolactam is that parts must be clean and dry to prevent contaminants and water from interfering with the polymerization. Thus, the apparatus must be preconditioned. After the parts have been cleaned and the tanks flushed, nozzle 13 is assembled and attached to the hoses and a cover (not shown) is attached to each tank, the cover having only a gas inlet. Hot, dry nitrogen is forced through each unit and hot oil is circulated to heat the tanks and hoses above 212° F., to drive out any water. Concurrently, the covers and parts attached thereto are heated in ovens to drive off any moisture. Then, the preconditioning cover is removed and covers 16, along with the parts mounted thereon, are assembled and dry nitrogen is fed through inlets 78.

When this has been done, the pistons 19 are raised to their uppermost positions by movement of handle 67. Valve members 30 are closed by rotating toggle lever 50 clockwise, FIG. 6, from its full line position to its phantom position as shown. This movement rocks link 53 clockwise upwardly against the bias of spring 47, which forces collar 46, guide 43 and valve rod 36 upwardly. During such movement of rod 36 the hollow piston 20 remains stationary. The tapered face of enlarged end 30 of the rod is thereby urged into seating engagement with its mating complemental tapered surface of opening 29 of piston 25. With the valves in their closed positions, plugs 17, FIG. 2, are removed whereupon caprolactam plus a catalyst is added to unit 11 and caprolactam plus a promoter is added to unit 10. Thereafter, the plugs are replaced and the stirrers actuated. Heaters 109 are adjusted to heat the liquids to the catalyzing and mixing temperatures. Then pin 62 is set in arcuate slot 63 of lever 61 by wing bolt 64 to provide the desired ratio of fluids to be accurately metered from the reservoirs and at least one of the blocks 75 is set to determine the quantity to be ejected.

After the liquids have been so treated as above, and are ready to be dispensed, valves 30 within piston 25 are opened by counterclockwise movement of bellcrank 50, FIG. 6. The heated and mixed materials within the tanks are thus permitted to flow downwardly through the piston to fill the cylinder and hoses below. Thereafter the valves 30 are again closed by clockwise rotation of toggle lever 50 and handle 67 is thereafter manually depressed to discharge metered quantities of material from the cylinders.

In order to dispense like metered quantities of material again the above steps are repeated. Valves 30, in pistons 19, are opened while each of the latter is at the bottom of their stroke. Thereafter handle 67 is slowly raised and during such slow movement the fluids in the upper chambers are permitted to pass through the opened valves within pistons 19 to fill the cylinders below. Upon completion of the movement of handle 67 to its uppermost position, the valves 30 may be again manually closed by movement of toggle lever 50 prior to once again starting the downstroke to eject metered quantities of liquid from the reservoirs.

Concerning nozzle 13, the liquids are dispensed into closed containers or molds and prior to such dispensing, valve 84 can be opened to purge the container with gas from the nozzle. The dispensing of the liquids can be accomplished with or without the gas flow.

It is obvious that the system is versatile and can be used for other liquids and operated on in a different manner. The provision of separate hot oil systems allows not only different treating temperatures but permits the liquid temperatures to be changed immediately prior to dispensing the liquids where this action is desirable.

Furthermore, the apparatus is designed to operate at temperatures at least as high as 500° F. and this is important because it permits melting any polycaprolactam that might be formed if the apparatus breaks down or is not operated and the catalyzed caprolactam polymerizes.

While only a single embodiment has been illustrated,

What is claimed is:

1. Dispensing apparatus adapted for operation at relatively high temperatures comprising: support means; a pair of vertical, parallel dispensing units mounted on said support means next to each other; each of said dispensing units comprising a supply tank, a cover on said tank, a metering cylinder connected to said tank, a reciprocal piston disposed in said cylinder and defining an expansible chamber, said reciprocal piston being heat resistant and plastic so as to readily conform to the wall surfaces of said cylinder, said reciprocal piston including annular lip portions protuding from opposite ends thereof, spring means received within said annular lip portions for urging the same in contact with the wall surfaces of said cylinder, said piston having a passage through which fluid is admitted to said chamber on the upstroke of said piston, a piston rod extending through said cover and connected to said piston, a valve member movable between open and closed position for controlling the flow of fluid through said flow passage, a valve actuating rod connected to said valve member and extending through said cover coaxial to said piston rod, and a selectively-operable actuating mechanism connected to said rods for moving one relative to the other upon operation of said mechanism; and means mounted on said support means for driving said piston rods, said means comprising two adjacent levers mounted on said support means for pivotal movement about the same axis, one of said two levers including an elongated arcuate slot, two links connected between said levers and said piston rods for driving said piston rods in response to pivoting of said levers, and means adjustably connecting at least one of said two links to the associated one of said levers and along said elongated arcuate slot to permit adjustment of the length of stroke of the associated piston.

2. Dispensing apparatus in accordance with claim 1 and including stop means connected to said piston rods to limit movement thereof and fix the maximum quantity of fluid admitted to said chambers on each upstroke.

3. In dispensing apparatus adapted for operation at relatively high temperatures, the combination comprising: a cylinder; a reciprocal piston disposed in said cylinder and having a flow passage therethrough; said recipocal piston being heat resistant and plastic so as to readily conform to the wall surfaces of said cylinder, a movable valve member for opening and closing said passage; a piston rod connected at one end to said piston; a valve actuating rod connected at one end to said valve member, said valve actuating rod being coaxial to said piston rod; valve actuating means connected to the other ends of said rods and operative upon actuation thereof to move one of said rods relative to the other; said valve actuating means having a member yieldably mounted on one of said rods, a toggle link connected between said member and the other one of said rods, and a manually actuated lever operatively connected for actuating said toggle link.

4. In dispensing apparatus adapted for operation at relatively high temperatures, the combination comprising: a supply tank adapted to contain a quantity of a liquid-to-be-dispensed; a metering cylinder connected to said tank; said tank and said cylinder including an outer shell and an outer hose spaced from said tank, said cylinder and said outer shell defining a space therebetween adapted to receive heated fluid for heating the contents of said tank, said cylinder and said hose; a reciprocal piston disposed in said cylinder and having a flow passage therethrough; said reciprocal piston being heat resistant and plastic so as to readily conform to the wall surfaces of said cylinder, a valve member adapted to control the flow of liquid through said passage; a piston rod connected at one end to said piston; a valve actuating rod connected at one end to said valve member and being coaxial to said piston rod; and a selectively-operable valve actuating mechanism mounted on the other ends of said rods for moving one of said rods relative to the other upon actuation of said mechanism.

References Cited by the Examiner

UNITED STATES PATENTS

| 679,504 | 7/1901 | Heard | 222—137 X |
| 1,316,528 | 9/1919 | Wooten et al. | 222—156 X |
| 2,077,756 | 4/1937 | Hurst | 222—131 |
| 2,199,405 | 5/1940 | Hutsell | 222—309 |
| 2,985,339 | 5/1961 | Fisher et al. | 222—309 |
| 3,097,763 | 7/1963 | Alvetto. | |

RAPHAEL M. LUPO, *Primary Examiner.*

ROBERT B. REEVES, *Examiner.*

F. R. HANDREN, *Assistant Examiner.*